(12) United States Patent
Sakurai et al.

(10) Patent No.: US 8,740,626 B2
(45) Date of Patent: Jun. 3, 2014

(54) ROTATIONAL CONNECTOR DEVICE INCLUDING A SPACER DISPOSED IN AN ANNULAR SPACE FORMED BETWEEN A ROTOR AND A STATOR

(75) Inventors: Junichi Sakurai, Tokyo (JP); Yasumasa Serizawa, Tokyo (JP)

(73) Assignee: Valeo Japan Co., Ltd., Tokyo (JP)

( * ) Notice: Subject to any disclaimer, the term of this patent is extended or adjusted under 35 U.S.C. 154(b) by 41 days.

(21) Appl. No.: 13/542,430

(22) Filed: Jul. 5, 2012

(65) Prior Publication Data

US 2013/0014975 A1 Jan. 17, 2013

(30) Foreign Application Priority Data

Jul. 12, 2011 (JP) .................................. 2011-154062

(51) Int. Cl.
H01R 39/00 (2006.01)

(52) U.S. Cl.
USPC .......................................................... 439/15

(58) Field of Classification Search
USPC ....................... 439/13, 15, 162, 164, 534, 475
See application file for complete search history.

(56) References Cited

U.S. PATENT DOCUMENTS

| 5,171,153 | A | * | 12/1992 | Kubota et al. .................... 439/15 |
| 5,259,775 | A | * | 11/1993 | Kubota et al. ................. 439/164 |
| 7,175,453 | B2 | * | 2/2007 | Yajima et al. ................. 439/164 |
| 2009/0317984 | A1 | | 12/2009 | Oishi et al. | |

FOREIGN PATENT DOCUMENTS

| DE | 10 2005 002676 B3 | 6/2006 |
| EP | 1 094 570 A2 | 4/2001 |
| EP | 1 564 849 A1 | 8/2005 |
| JP | 2005-228561 A | 8/2005 |

OTHER PUBLICATIONS

European Search Report issued Oct. 26, 2012 for corresponding European Application No. 12 00 5077.

* cited by examiner

*Primary Examiner* — Chandrika Prasad
(74) *Attorney, Agent, or Firm* — Rader, Fishman & Grauer PLLC (57) ABSTRACT

A spacer arranged in an annular space between a rotor and a stator for supporting a roller reversing a winding direction of a flat cable is made of plastic having high lubricating properties. First guide portions on an annular plate portion are spaced by equal intervals from each other. The first guide portion includes an inner guide rib having a semicircle cross section projecting inward, an outer guide rib having a semicircle cross section projecting outward, and a tension wall connecting the inner guide rib and the outer guide rib. A second guide portion is provided between the first guide portions, and includes three parallel plate ribs extending from an inner peripheral side to an outer peripheral side of the annular plate portion, and circumferential connecting walls connecting the three parallel plate ribs.

7 Claims, 6 Drawing Sheets

ROTATIONAL CONNECTOR DEVICE INCLUDING A SPACER DISPOSED IN AN ANNULAR SPACE FORMED BETWEEN A ROTOR AND A STATOR

CROSS-REFERENCE TO RELATED APPLICATION

This application claims priority under 35 USC 119 from Japanese Patent Application No. 154062/2011 filed on Jul. 12, 2011, the disclosure of which is incorporated by reference herein.

BACKGROUND OF THE INVENTION

1. Field of the Invention

The present invention relates to a rotational connector device which is used in a relatively rotational component to perform an electrical connection for control of an air bag device incorporated in a steering device for an automobile or control of an audio device or a constant speed traveling device by a switch button provided on a steering wheel for an automobile.

2. Description of the Related Art

An example of this kind of rotational connector device includes a device where an annular space is formed between a rotor coupled to a rotating steering shaft and a stator coupled to a vehicle fixed side and a flat cable a winding direction of which is reversed in the middle is accommodated in the annular space in a winding state. One end of this flat cable is fixed to the rotor side, and the other end is fixed to the stator side. The flat cable is reeled out from a cylindrical wall surface of the rotor corresponding to a rotational direction of the rotor and is wound around a cylindrical wall surface of the stator or reeled out from the cylindrical wall surface of the stator and is wound around the cylindrical wall surface of the rotor. This movement is repeated, so that an angular change between the rotor and the stator due to a relative rotation therebetween is absorbed by a change of the winding state of the flat cable. A spacer is arranged between the rotor and the stator for regulating a route of the flat cable. Conventionally many rollers are supported on the spacer for reducing a sliding resistance to the flat cable, but in recent years, there has been made an attempt of reducing the number of the rollers in view of a reduction in costs.

For example, Japanese Patent Issue No. 4355229 discloses a rotational connector device in which a rotor is provided with an inner cylindrical portion and a stator is provided with an outer cylindrical portion wherein a spacer (holder) is rotatably arranged therebetween in a state of being supported by the stator. The spacer supports a single roller, and a plurality of guide portions are formed by intervals in the circumferential direction to sandwich the roller therebetween, each guide portion having a wall surface an outer envelope curve of which forms a circle and an inner envelope curve of which forms a circle concentric with the inner cylindrical portion. Each guide portion is formed in a frame shape having a closed plane configuration, and the outer surface forms a circular arc along the envelope curve. A circle formed by the outer envelope curve is eccentric to the inner cylindrical portion of the rotor, and intervals between the roller and each outer surface of the guide portions adjacent to both sides of the roller, and the outer cylindrical portion of the stator are made small, and on the other hand, an interval between an outer surface of the guide portion and the outer cylindrical portion of the stator present at an opposite side to the above guide portion in such a manner as to sandwich a rotational center of the spacer is made large. The flat cable wound around the inner cylindrical portion and the outer cylindrical portion is reversed between the roller and a side surface of the guide portion which is one of the guide portions adjacent to the roller. The flat cable rotates the spacer via a reverse section thereof corresponding to the rotational direction of the rotor.

However, the conventional rotational connector device is heavy since the spacer is structured such that many frame-shaped guide walls are provided to rise on the annular plate portion. As a result, because of a large sliding resistance to the flat cable generated at rotor rotating, there is a possibility that the flat cable buckles at the time the flat cable pushes a side wall of the guide wall.

In addition, in a steering wheel for an automobile, it is required to make rotation possible numbers (possible angles) in the right and left directions equal, and, for example for preventing the event that the flat cable can not rotate to a prescribed rotational number since the flat cable is tightly wound and fixed on the inner cylindrical portion in the middle of the rotating, it is absolutely required as a practical product to use a method that an indicator is incorporated in the spacer for indicating a neutral position to be used as an index on assembling. However, the rotational connector device disclosed in Japanese Patent Issue No. 4355229 can not set such an indicator. That is, according to the conventional rotational connector device, the circle formed by the envelope curve of the guide wall in the spacer is eccentric to the inner cylindrical portion and a large space is formed in a radial direction between the guide wall and the outer wall portion. Therefore the route of the flat cable, which will be reversed in the roller part and reeled out to the outer cylindrical portion side, varies. As a result, a reeling-out length of the flat cable is equal, but a rotational angle of the steering wheel is not constant, so that the indicator position can not be determined.

SUMMARY OF THE INVENTION

Accordingly, the present invention is made in view of the above described problems, and the present invention has an object to provide a rotational connector device which is light-weighed and in which a route of a flat cable is appropriately regulated to prevent buckling of the flat cable.

For this purpose, according to an aspect of the present invention, a rotational connector device comprises a rotor, a stator forming an annular space between the rotor and the stator, a spacer rotatably arranged in the annular space, a single roller supported by the spacer, and a flat cable of which both sides are reeled out from the annular space via the rotor and the stator, the flat cable being accommodated in the annular space in a state where a winding direction is reversed in the middle by the roller, wherein the spacer comprises an annular plate portion, a roller support portion provided on the annular plate portion, and a plurality of first guide portions provided on the annular plate portion, the roller support portion and the first guide portion respectively rising in the axial same direction on the annular plate portion, wherein the roller support portion rotatably supports the roller, the first guide portions are arranged to be spaced in the circumferential direction to sandwich the roller support portion therebetween on the annular plate portion, each comprising an inner guide rib having a curved surface projecting inwards in an inner peripheral side of the annular plate portion and an outer guide rib having a curved surface projecting outwards in an outer peripheral side of the annular plate portion, and the annular plate portion is provided with a lightening hole formed between the inner guide rib and the outer guide rib in each of the first guide portions.

According to the aspect of the present invention, the route of the flat cable is regulated by the first guide portion, the first guide portion is not formed in a framed shape in which the entire circumference is closed, but comprises the inner guide rib and the outer guide rib separated, each rib having the curved surface, to remove the intermediate section therebetween, and also in the annular plate portion, a region sandwiched by the inner guide rib and the outer guide rib forms a lightening hole. Therefore the rigidity is maintained by each curved surface of both the guide ribs, the spacer is made light in weight, and the sliding resistance to the flat cable at rotor rotating is reduced to effectively suppress the buckling of the flat cable.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DESCRIPTION OF THE EMBODIMENTS

Hereinafter, an embodiment in the present invention will be explained with reference to the accompanying drawings.

Figure 1:
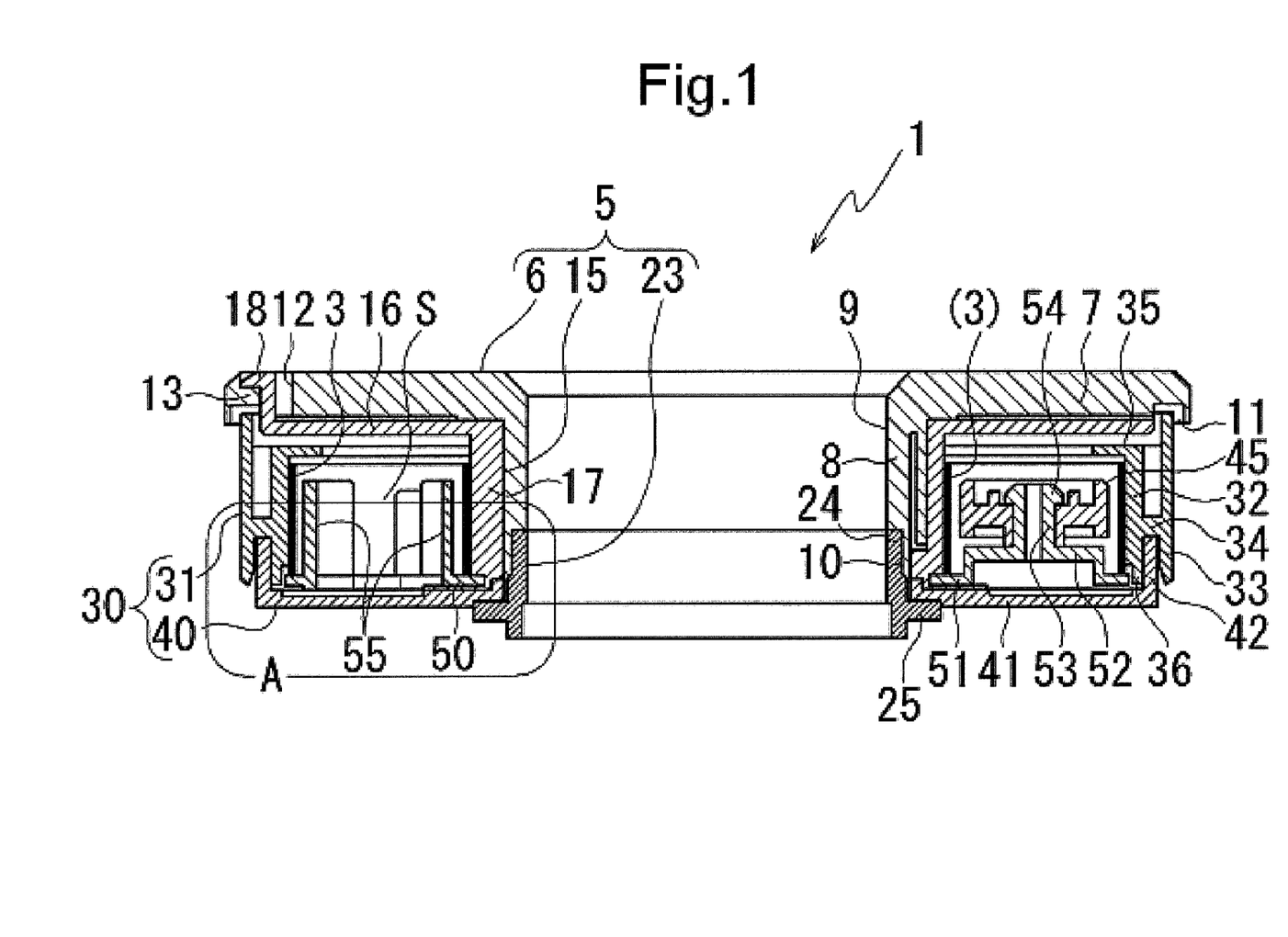
FIG. 1 is a cross section showing a rotational connector device according to an embodiment in the present invention.
Figure 2:
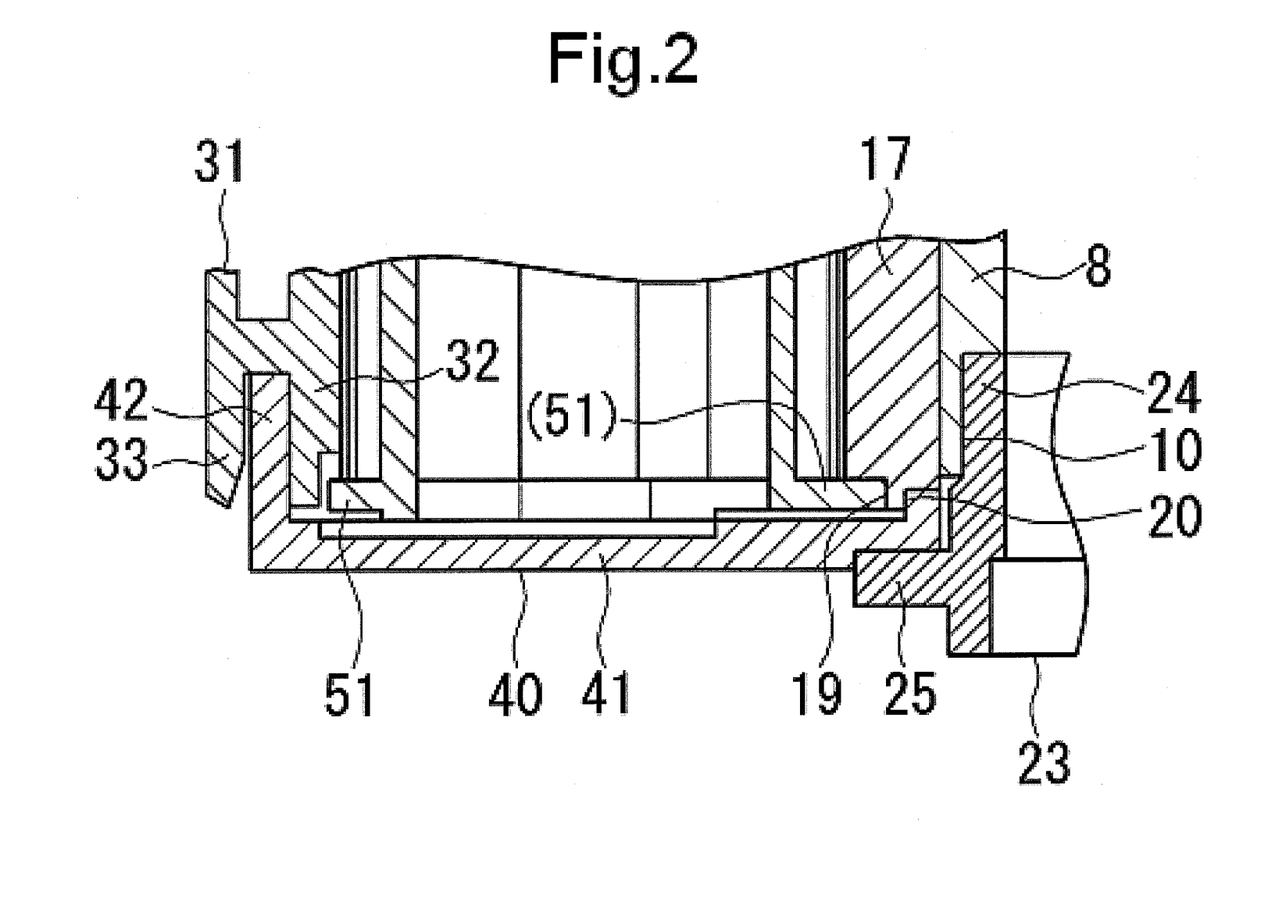
FIG. 2 is an enlarged cross section of A portion in FIG. 1.

FIG. 1 is a cross section showing a rotational connector device according to an embodiment, and FIG. 2 is an enlarged view of A portion in FIG. 1. A rotational connector device 1 comprises a rotor 5, a stator 30, and a flat cable 3 and a spacer 50 arranged between the rotor 5 and the stator 30. The rotor 5 comprises a rotor body 6, a liner 15, and a rotor attachment 23, each being made of plastic. The rotor body 6 includes a disc portion 7, and a cylindrical portion 8 axially extending from the center of the disc portion 7 and having a through hole 9 therein. An inner diameter of the cylindrical portion 8 in a predetermined range from a front end thereof forms an enlarged diameter portion 10 larger than that of the upper section. A ring-shaped groove 11 is formed in an inner side just proximal to an outer peripheral edge on the backside of the disc portion 7. The liner 15 includes a ceiling plate portion 16 extending along the backside of the disc portion 7 in the rotor body 6, and an inner cylindrical portion 17 for covering an outer peripheral surface of the cylindrical portion 8, wherein the liner 15 is coupled to the rotor body 6 by engaging a hook nail 18 provided in an outer edge of the ceiling plate portion 16 to an engagement portion 13 of an engagement hole 12 provided in close proximity to an outer periphery of the disc portion 7. The ceiling plate portion 16 covers the backside of the disc portion 7 in a range corresponding to the inner diameter side from the groove 11. A reduced diameter portion 19 is formed on an outer surface at the lower end portion of the inner cylindrical portion 17 and an enlarged diameter portion 20 is formed on an inner surface at the lower end portion thereof. The rotor attachment 23 is formed in a short, cylindrical shape, and has a fitting portion 24 to be fitted in the enlarged diameter portion 10 of the cylindrical portion 8 in the rotor body 6. An inner peripheral surface of the rotor attachment 23 is in flush with an upper inner peripheral surface of the through hole 9 in the cylindrical portion 8. The rotor attachment 23 has a flange 25 on an outer periphery downward of the fitting portion 24.

The stator 30 comprises a plastic case 31 and a plastic bottom cover 40, and forms an annular space S between the stator 30 and the rotor 5. The case 31 surrounds the annular space S in the radial direction, and a basic form in section thereof has an H configuration in which two vertical (upper and lower) walls of an inner wall 32 and an outer wall 33 axially in parallel with each other are connected by a connecting portion 34. An upper end of the outer wall 33 extends inside the groove 11 of the disc portion 7 in the rotor body 6, and on the other hand, a retaining flange 35 extends in an inner diameter direction by a predetermined amount from an upper end of the inner wall 32 to oppose the ceiling plate portion 16 of the liner 15. This flange 35 serves to prevent the flat cable 3 from pulling out from a constant position. An enlarged diameter portion 36 is formed on an inner surface at the lower end portion of the inner wall 32.

The bottom cover 40 defines a lower end of the annular space S, is formed of a disc portion 41 as a major portion, and is integral with the case 31 by fitting a fitting wall 42 provided to axially rise from the outer peripheral edge of the disc portion 41 into an interval between the inner wall 32 and the outer wall 33 in the case 31. An inner peripheral edge of the disc portion 41, a projection of which projects upwards and is fitted into an enlarged diameter portion 20 at a lower end of the inner cylindrical portion 17 in the liner 15, is rotatably sandwiched between the inner cylindrical portion 17 and the flange 25 of the rotor attachment 23.

The spacer 50 is made of a plastic having high lubricating properties such as polyacetal, and supports a roller 45 on an annular plate portion 51, as well as is provided with guide portions to be described later by rib molding. For supporting the roller 45, a base portion 52 is formed on the annular plate portion 51, and a pin 53 rises from the center of the base portion 52 for rotatably supporting the roller 45. The pin 53 is divided into two parts along the diameter line, each front end of which is provided with a nail 54, which is engaged to an axial hole end edge of the roller 45 for the retaining. The base portion 52 is accommodated in a diameter of the roller 45 in a radial direction, as well as in a circumferential direction of the annular plate portion 51, thereby preventing an interference with the flat cable 3 wound and reversed around the roller 45.

The annular plate portion 51 is positioned by sandwiching the inner peripheral edge between the inner cylindrical portion 17 and the disc portion 41 of the bottom cover 40 in the reduced diameter portion 19 of the inner cylindrical portion 17 in the liner 15 and by sandwiching the outer peripheral edge between the inner wall 32 and the disc portion 41 of the bottom cover 40 in the enlarged diameter portion 36 of the inner wall 32 in the case 31, and at the same time, is arranged to be rotatable relatively to the rotor 5 and the stator 30.

The flat cable 3 is accommodated in the annular space S and is arranged between the inner cylindrical portion 17 of the liner 15 and the first guide portion 55 of the spacer 50, and is reversed in part of the roller 45 and is arranged between the inner wall 32 of the case 31 and the first guide portion 55 of the spacer 50 to be in a winding state. In this arrangement, one end of the flat cable 3 is pulled outside of the annular space via the cylindrical portion 8 from the liner 15 in a side of the rotor 5, and the other end thereof is pulled outside of the annular space via the case 31 of the stator 30.

Figure 3:
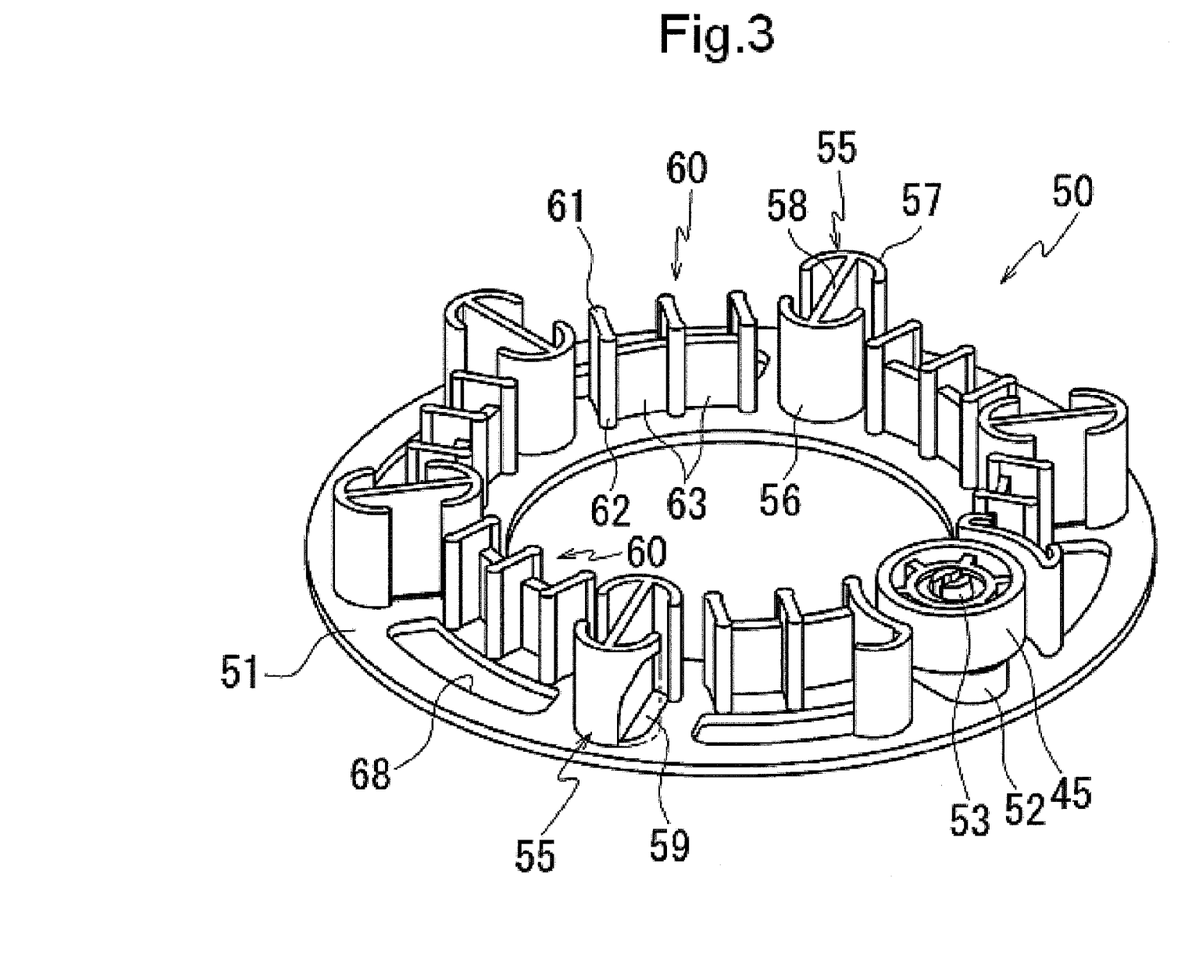
FIG. 3 is a perspective view showing a spacer in the embodiment.
Figure 4:
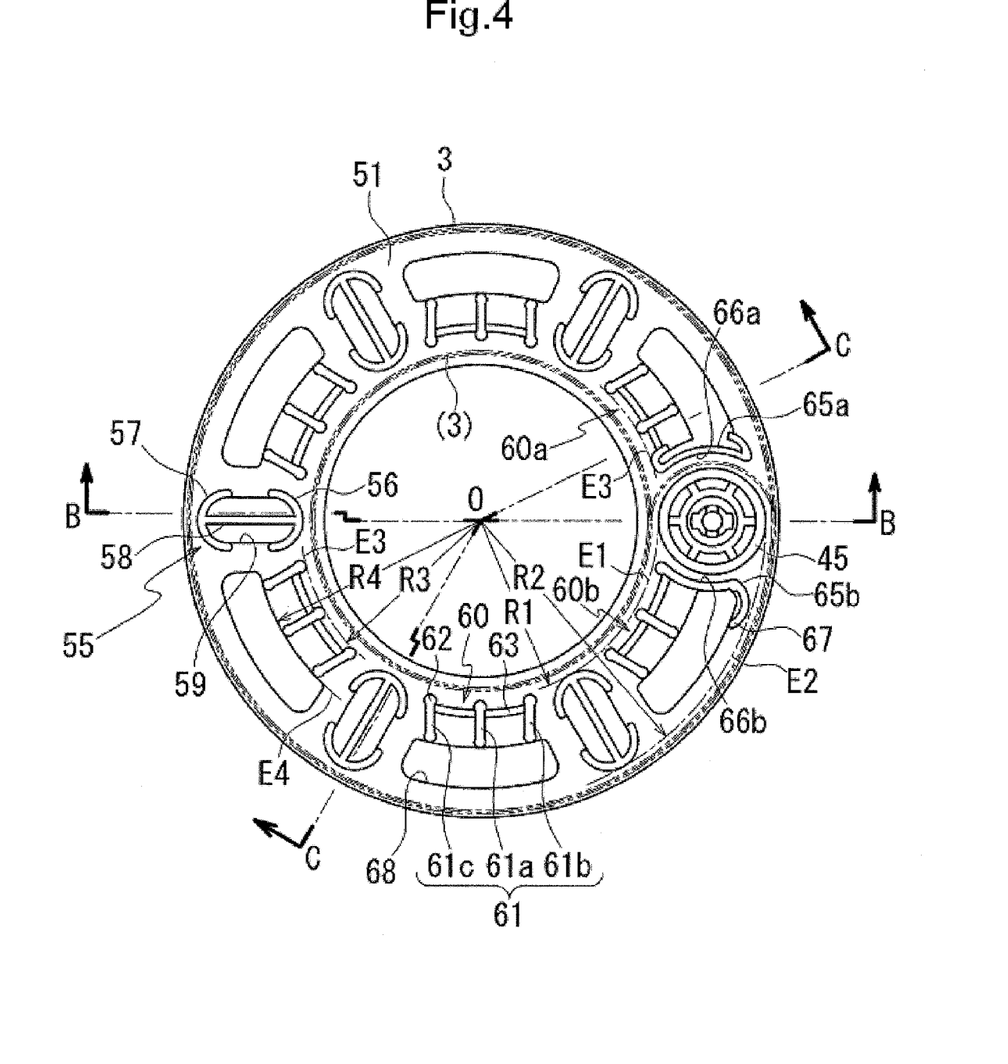
FIG. 4 is a plan view showing the spacer in the embodiment.
Figure 5:
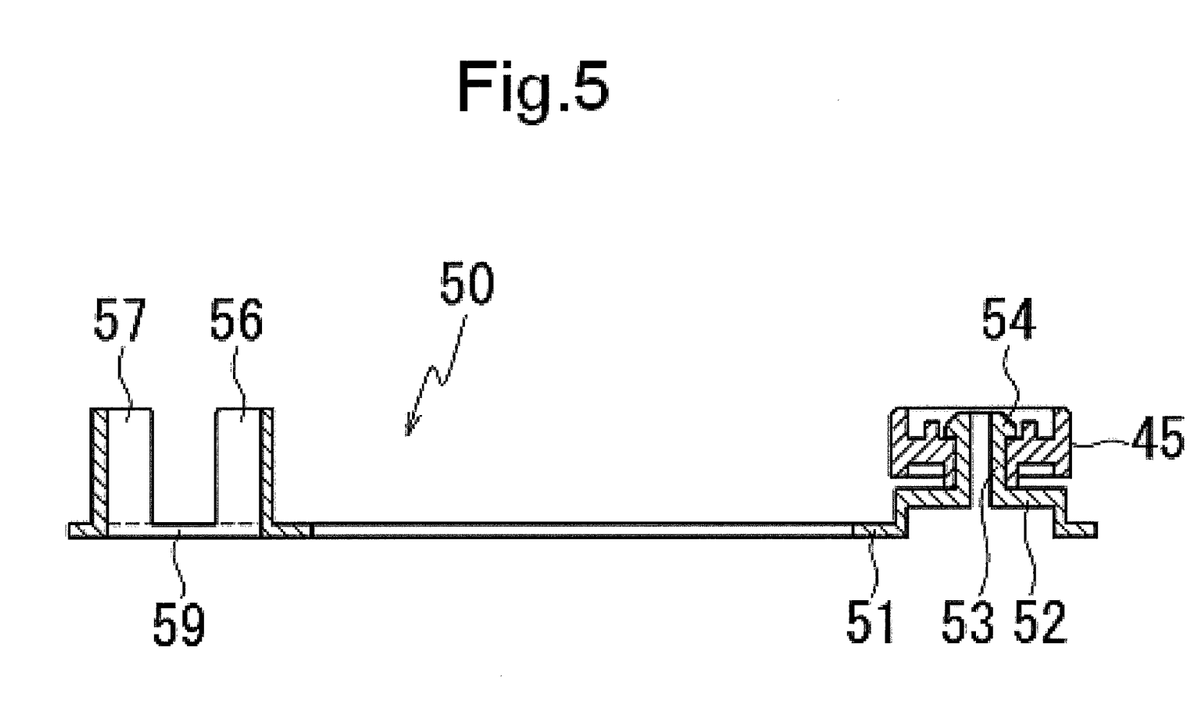
FIG. 5 is a cross section taken along lines B-O-B in FIG. 4.
Figure 6:
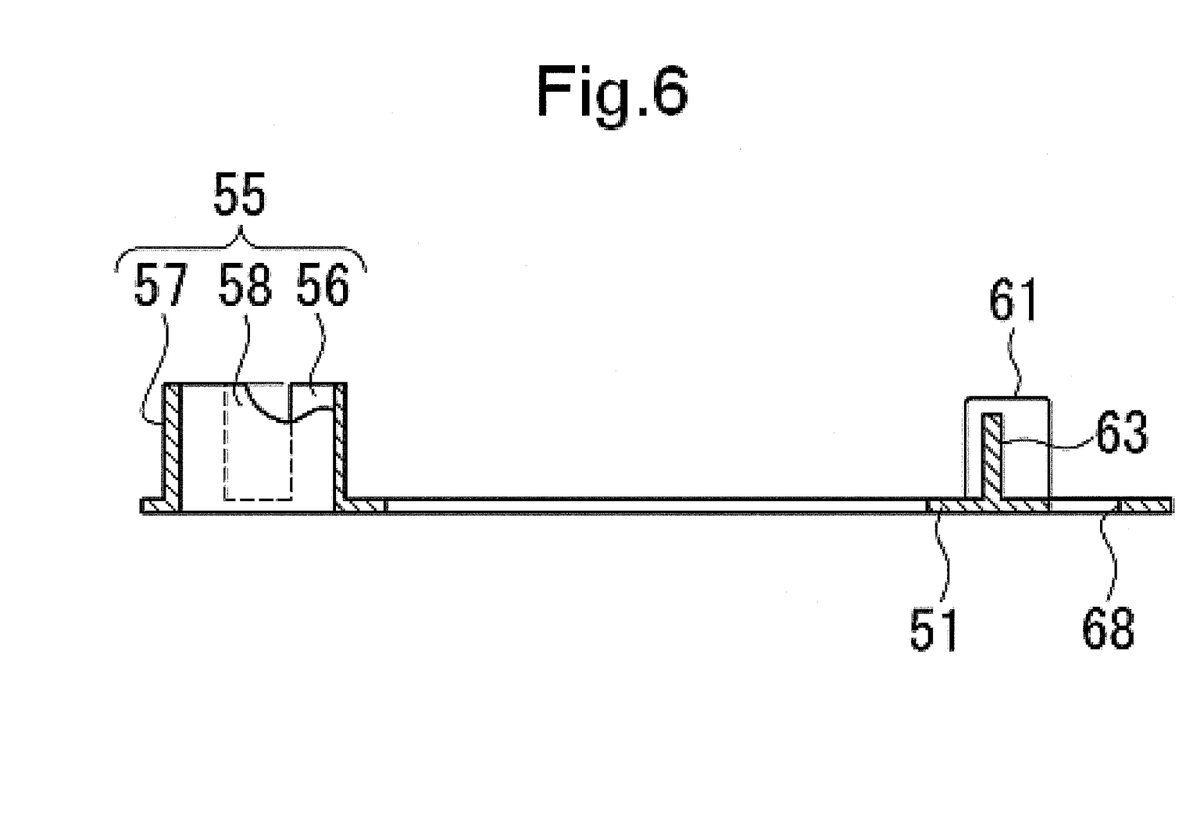
FIG. 6 is a cross section taken along lines C-O-C in FIG. 4.

Hereinafter, the details of the spacer 50 will be explained. FIG. 3 is a perspective view showing the spacer, FIG. 4 is a plan view showing the spacer. FIG. 5 is a cross section taken along lines B-O-B in FIG. 4 and is the same as the device shown in FIG. 1. FIG. 6 is a cross section taken along lines C-O-C in FIG. 4. As shown in FIG. 3 and FIG. 4, five first guide portions 55 are provided by equal intervals in the circumferential direction from the roller 45 on the annular plate portion 51 at the same side as the base portion 52 (and the pin 53) supporting the roller 45, and further, second guide portions 60 are provided between the roller 45 and the first guide portion 55 adjacent thereto, and between the first guide portions 55 each other.

The first guide portion 55 is provided with an inner guide rib 56 arranged in an inner side on a radius line of the annular plate portion 51 and an outer guide rib 57 arranged in an outer side on a radius line of the annular plate portion 51, each rib having a curved surface and extending in an axial direction. Here, each rib has a wall surface formed in a semicircle in section as the curved surface. The inner guide rib 56 has the curved surface projecting toward an inner side and the outer guide rib 57 has the curved surface projecting toward an outer side, wherein a single tension wall 58 connects the inner guide rib 56 and the outer guide rib 57 at each width center thereof. A radius of each outer peripheral surface of the inner guide rib 56 and the outer guide rib 57 is set smaller than a radius of the roller 45.

As shown in FIG. 5 and FIG. 6, each thickness of the inner guide rib 56, the outer guide rib 57 and the tension wall 58 is equivalent to a plate thickness of the annular plate portion 51. In addition, an axial height of the tension wall 58 is equal to the height of the inner guide rib 56 and the outer guide rib 57, and a height of the first guide portion 55 is equal to a height of an upper end of the roller 45 supported by the pin 53. FIG. 6 shows a partially broken view of the tension wall 58. A lightening hole 59 is formed between the inner peripheral surface of the inner guide rib 56 and the inner peripheral surface of the outer guide rib 57 in the annular plate portion 51. However, also in the lightening hole 59, the tension wall 58 extends to a bottom surface of the annular plate portion 51, and as a result, the lightening hole 59 is divided into two sections in the circumferential direction. It should be noted that in FIG. 3, a part of the first guide portion 55 is shown as a broken view for illustrating the lightening hole 59.

A circle concentric with the annular plate portion 51 and touching an inside of an outer peripheral surface of the roller 45 in a state of being supported by the pin 53 of the base portion 52 is indicated at a first circle E1 (radius R1), and a circle touching an outside of the outer peripheral surface of the roller 45 is indicated at a second circle E2 (radius R2), wherein the outer peripheral surface of the inner guide rib 56 is set to touch the first circle E1, and the outer peripheral surface of the outer guide rib 57 is set to touch the second circle E2. When the spacer 50 is arranged and assembled in the annular space S between the rotor 5 and the stator 30, a gap between the first circle E1 and the inner cylindrical portion 17 of the liner 15 and a gap between the second circle E2 and the inner wall 32 of the case 31 are set to be a predetermined value. Thereby the flat cable is guided without any large clearance between the inner guide rib 56 and the inner cylindrical portion 17 and between the outer guide rib 57 and the inner wall 32. That is, the first guide portions 55 regulate the route of the flat cable as replacements to the rollers which could be arranged at the same positions as the first guide portions 55. Since a radius of the curved surface in each of the inner guide rib 56 and the outer guide rib 57 of the first guide portion 55 is smaller than a radius of the roller 45, a contact area of the curved surface with the flat cable is made small. Therefore, a sliding resistance to the flat cable 3 is small.

The second guide portion 60 is structured such that three plate ribs 61 (61a, 61b, and 61c) in parallel with each other on a plan view rise from the annular plate portion 51 in the same direction as the first guide portion 55, wherein an inner end of each rib 61 is concentric with the annular plate portion 51 and touches a third circle E3 (radius R3) larger in diameter by a predetermined amount than the first circle E1, and an outer end of each rib 61 touches a fourth circle E4 (radius R4) larger in diameter than the third circle E3 and passing the substantial center in a radial width of the annular plate portion 51. The central plate rib 61a out of the three ribs extends on a radius line of the annular plate portion 51, and the plate ribs 61b and 61c in both the sides adjacent to the plate rib 61a are respectively spaced by an equal distance from the central plate rib 61a. The respective adjacent plate ribs 61 are connected by the connecting walls 63.

A plate thickness of each plate rib 61 is equivalent to that of the annular plate portion 51, and as shown in FIG. 6, a height thereof from the annular plate portion 51 is lower by a predetermined amount than a height of the first guide portion 55. A plate thickness of the connecting wall 63 is equal to or slightly thinner than that of the plate rib 61, and as shown in FIG. 6, a height of the connecting wall 63 from the annular plate portion 51 is further lower by a predetermined amount than each of the plate ribs 61a, 61b and 61c. The reason the respective heights of the above components from the annular plate portion 51 are lower in order of the first guide portion 55, the plate rib 61, and the connecting wall 63 is that, when the flat cable 3 is curved, since the flat cable 3 makes contact with the first guide portion 55, the plate rib 61, and the connecting wall 63 in that order, the component having a high possibility of the sliding contact is set higher in height and the component having a low possibility of the sliding contact is set lower in height also in consideration of the light-weighing. The inner end of each plate rib 61 touching the third circle E3 is provided with a columnar portion 62 which has a diameter sufficiently smaller than the outer peripheral surface of the inner guide rib 56 in the first guide portion 55 and a plate thickness of which is slightly larger than that of the plate rib 61. An outer end of each plate rib 61 touching the fourth circle E4 is also provided with a columnar portion 62 similar to the above. The connecting portion 63 is connected in close proximity to the columnar portion 62 as the inner end of the plate rib 61, and is formed in an arc shape to be concentric with the annular plate portion 51.

It should be noted that in the second guide portion 60a adjacent to an upper side of the roller 45 particularly in FIG. 4 among the second guide portions 60, a curved rib 65a instead of a plate rib 61c in close proximity to the roller 45 rises from the annular plate portion 51. The curved rib 65a has an arc surface 66a substantial concentric with the roller 45 and spaced by a predetermined interval from the outer peripheral of wall the roller 45. The curved rib 65a has an inner end touching the third circle E3 and an outer end at a slightly inner side from the second circle E2 respectively folded back in a direction opposite to the roller 45. The flat cable 3 is put through the predetermined interval between the curved rib 62a and the roller 45, wherein a reverse part of the flat cable 3 is formed. FIG. 4 shows the flat cable 3 in a two-dot chain line.

In addition, in the second guide portion 60b adjacent to a lower side of the roller 45 in FIG. 4 among the second guide portions 60, a curved rib 65b instead of a plate rib 61b in close proximity to the roller 45 rises from the annular plate portion 51. The curved rib 65b has an arc surface 66b concentric with the roller 45 and spaced by a predetermined interval from the outer peripheral surface of the roller 45. The predetermined interval between the arc surface 66b and the roller 45 is set narrower than the predetermined interval between the upper curved rib 65a (arc surface 66a) and the roller 45 because the flat cable 3 is not put through the interval between the arc surface 66b and the roller 45. On the other hand, an outer end of the curved rib 65b is connected in a folding-back direction to an arc wall 67 of a relatively large diameter similar to the outer guide rib 57 of the first guide portion 55.

As described above, the flat cable 3 is regulated to the route substantially fixed along the inner cylindrical portion 17 of the liner 15 and the inner wall 32 of the case 31 to be not shifted largely from the route. Therefore the indicator showing a neutral position in a rotational range of the rotor 5 to the stator 30 can be provided on the spacer or the like, which can be used as a reliable index on assembling.

A lightening hole 68 is formed outside of the second guide portion 60 in the annular plate portion 51 of the spacer 50. The lightening hole 68 is configured between the first guide portions 55 such that an inner edge thereof touches the outer end of the plate rib 61 and an outer edge thereof extends in the circumferential direction to leave a predetermined width in an outer peripheral side of the annular plate portion 51. A length of the lightening hole 68 is longer than the circumferential length between both of the plate ribs 61b and 61c in the second guide portion 60 except for a section adjacent to the roller 45. The section of the lightening hole 68 adjacent to the roller 45 differs in a point where an end of the lightening hole 68 in a side of the roller 45 terminates to the curved rib 65a or 65b opposing the roller 45, and the other part of the lightening hole 68 is the same as the other section not adjacent to the roller 45.

In the present embodiment, the base portion 52 and the pin 53 form part of the roller support portion in the present invention. In addition, the lightening hole 59 corresponds to a first lightening hole, and the lightening hole 68 corresponds to a second lightening hole.

The present embodiment is configured as described above, wherein in the rotational connector device where the flat cable 3 is accommodated in the annular space S between the rotor 5 and the stator 30 in a state where the winding direction of the flat cable 3 is reversed in the middle by the roller 45, only the single roller 45 is rotatably supported by the base portion 52 and the pin 53 rising from the annular plate portion 51 in the spacer 50 arranged in the annular space S, the spacer 50 comprises the plurality of the first guide portions 55 rising in the axial same direction as the base portion 52 and the pin 53 from the annular plate portion 51 in the spacer 50, the first guide portions 55 are arranged by equal intervals in the circumferential direction to sandwich the support portion of the roller 45 on the annular plate portion 51, each first guide portion 55 comprises the inner guide rib 56 having the curved surface of the semicircle projecting inwards in the inner peripheral side of the annular plate portion 51 and the outer guide rib 57 having the curved surface of the semicircle projecting outwards in the outer peripheral side of the annular plate portion 51, and the lightening hole 59 is formed between the inner guide rib 56 and the outer guide rib 57 in each of the first guide portions in the annular plate portion 51. With this configuration, since the roller 45 is provided as a single one for the reverse section of the flat cable 3 to eliminate the number of components and the other roller conventionally required is replaced by the first guide portion 55 integral with the annular plate portion 51, costs and assembling labors and hours can be reduced.

In addition, the first guide portion 55 is not formed in a framed shape closed in the entire circumference, but is divided into the inner guide rib 56 and the outer guide rib 57 and the intermediate section thereof is removed. Therefore the spacer 50 is reduced in weight corresponding to the removal. In addition, the region in the annular plate portion 51 sandwiched by the inner guide rib 56 and the outer guide rib 57 forms part of the lightening hole 59 to further reduce the weight. That is, since the inner guide rib 56 and the outer guide rib 57 each have the curved surface, even when the inner guide rib 56 and the outer guide rib 57 are arranged to be spaced independently from each other, the rib itself has high rigidity to increase the rigidity of a hole edge in the lightening hole 59, and the light weight is realized. As a result, the sliding resistance at the rotating of the spacer 50 is reduced, thereby suppressing the buckling of the flat cable 3.

In addition, since the inner guide rib 56 and the outer guide rib 57 in the first guide portion 55 are connected by the single tension wall 58, the first guide portion 55 still has an advantage of the light weight as compared to the frame shape closed in the entire circumference, as well as the inner guide rib 56 and the outer guide rib 57 are prevented from falling down in the radial direction of the annular plate portion 51. That is, for example, by setting the indicator, the confirmation of the rotational neutral position of the rotor 5 on assembling is easy to be made, but just in case where the rotational connector is assembled at the wrong neutral position in the steering wheel, the room for reeling out the flat cable 3 from a side of the inner cylindrical portion 17 or a side of the inner wall 32 in the annular space S disappears in the middle of the rotating of the rotor 5. Therefore when the rotor 5 is forcibly rotated, the flat cable 3 results in being subjected to a large tension force. As a result, the inner guide rib 56 or the outer guide rib 57 making contact with the flat cable 3 is subjected to a force for falling down the rib. When the inner guide rib 56 or the outer guide rib 57 falls down, the flat cable 3 having been subjected to the large tension force slips, and there is a possibility that the assembling state of the rotor 5 and the stator 30 forming the annular space S will be damaged due to the impact. The configuration that the tension wall 58 prevents the inner guide rib 56 and the outer guide rib 57 from falling down is particularly effective for overcoming such a state.

Further, the second guide portion 60 provided with the plate ribs 61 extending from the inner peripheral side to the outer peripheral side of the annular plate portion 51 is provided between the first guide portions 55 along the circumferential direction of the annular plate portion 51 in the spacer 50, and the inner end edge of the plate rib 61 is positioned outwards by a predetermined amount from the first circle E1 concentric with the annular plate portion 51 and making internal contact with each guide rib 56 of the first guide portions 55. Therefore the flat cable 3 the route of which is regulated by the first guide portion 55 does not regularly make contact with the second guide portion 60, but just in case where the flat cable 3 is deflected to be shifted to the side between the inner guide ribs 56 of the first guide portions 55, the flat cable 3 makes contact with the inner end of the plate rib 61 to prevent the shift, thereby preventing the buckling of the flat cable 3.

In addition, the plate rib 61 rises from the annular plate portion 51, and thereby the plane rigidity of the annular plate portion 51 also improves.

Particularly the plural plate ribs 61 are provided in the circumferential direction between the inner guide ribs 56, and are connected by the connecting walls 63. Therefore the clearance between the first guide portions 55 is densely buried, and as a result, the shift of the flat cable 3 is certainly blocked and the plane rigidity of the annular plate portion 51 also further improves. In addition, the connecting walls 63 certainly block for the flat cable 3 to be shifted to the side between the plate ribs 61a, 61b and 61c. Further, since the inner end of the plate rib 61 together with the outer end is formed as the columnar portion 62 having the curved surface, the sliding resistance generated at the time the plate rib 61 makes contact with the flat cable 3 can be made small, and there is no possibility of damaging the flat cable 3.

Further, the annular plate portion 51 is provided with the lightening hole 68 formed in a predetermined range outward of the second guide portion 60 and inward of the outer periphery in the annular plate portion 51. Therefore the spacer 50 can be made lighter in weight and the sliding resistance to the flat cable 3 can be reduced. In addition, also by making the spacer 50 of plastic having high lubricating properties, the sliding resistance can be reduced, preventing occurrence of sliding contact noises with the flat cable 3, the stator 30 or the like.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A rotational connector device comprising:
   a rotor;
   a stator forming an annular space between the rotor and the stator;
   a spacer rotatably arranged in the annular space;
   a single roller supported by the spacer; and
   a flat cable of which both sides are reeled outside of the annular space via the rotor and the stator, the flat cable being accommodated in the annular space in a state where a winding direction thereof is reversed in the middle by the roller, wherein
   the spacer comprises:
   an annular plate portion;
   a roller support portion provided on the annular plate portion; and
   a plurality of first guide portions provided on the annular plate portion, the roller support portion and the first guide portion respectively rising in the axial same direction on the annular plate portion, wherein
   the roller support portion rotatably supports the roller, the first guide portions are arranged to be spaced in the circumferential direction to sandwich the roller support portion therebetween on the annular plate portion, each first guide portion comprising an inner guide rib having a curved surface projecting inwards in an inner peripheral side of the annular plate portion and an outer guide rib having a curved surface projecting outwards in an outer peripheral side of the annular plate portion, and
   the annular plate portion is provided with a first lightening hole formed between the inner guide rib and the outer guide rib in each of the first guide portions,
   wherein, in the first guide portion, the inner guide rib and outer guide rib are connected by a single tension wall at each width center thereof.

2. A rotational connector device according to claim 1, wherein
   in the first guide portion, the inner guide rib and the outer guide rib are connected by a single tension wall.

3. A rotational connector device according to claim 1, further comprising:
   a second guide portion provided between the first guide portions along a circumferential direction of the annular plate portion, the second guide portion being provided with a plate rib extending from an inner peripheral side to an outer peripheral side of the annular plate portion, wherein
   an inner end edge of the plate rib is positioned outwards by a predetermined amount from an internal contact circle concentric with the annular plate portion and touching each of the inner guide ribs of the first guide portions.

4. A rotational connector device according to claim 3, wherein
   the second guide portion includes a plurality of the plate ribs in the circumferential direction, and
   the plurality of the plate ribs are connected by circumferential connecting walls.

5. A rotational connector device according to claim 3, wherein
   at least an inner end edge of the plate rib in the second guide portion is formed in a curved surface.

6. A rotational connector device according to claim 3, wherein
   the annular plate portion is provided with a second lightening hole formed in a predetermined range outward of the second guide portion and inward of an outer periphery of the annular plate portion.

7. A rotational connector device according to claim 1, wherein
   the spacer is made of plastic having high lubricating properties.

* * * * *